G. W. PRIEST.
APPARATUS FOR LINING PIPES.
APPLICATION FILED FEB. 15, 1909. RENEWED JAN. 24, 1913.
1,072,495.
Patented Sept. 9, 1913.
3 SHEETS—SHEET 2.
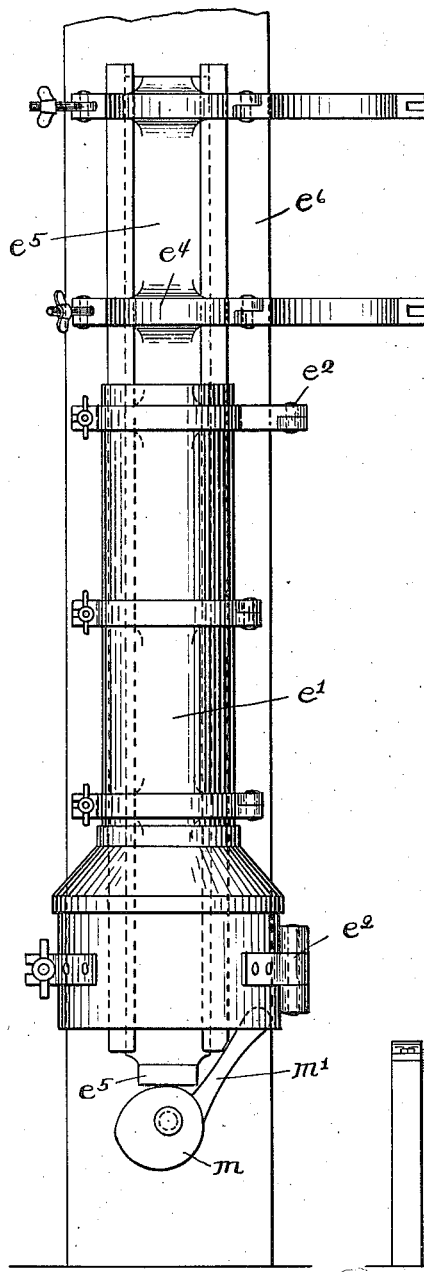
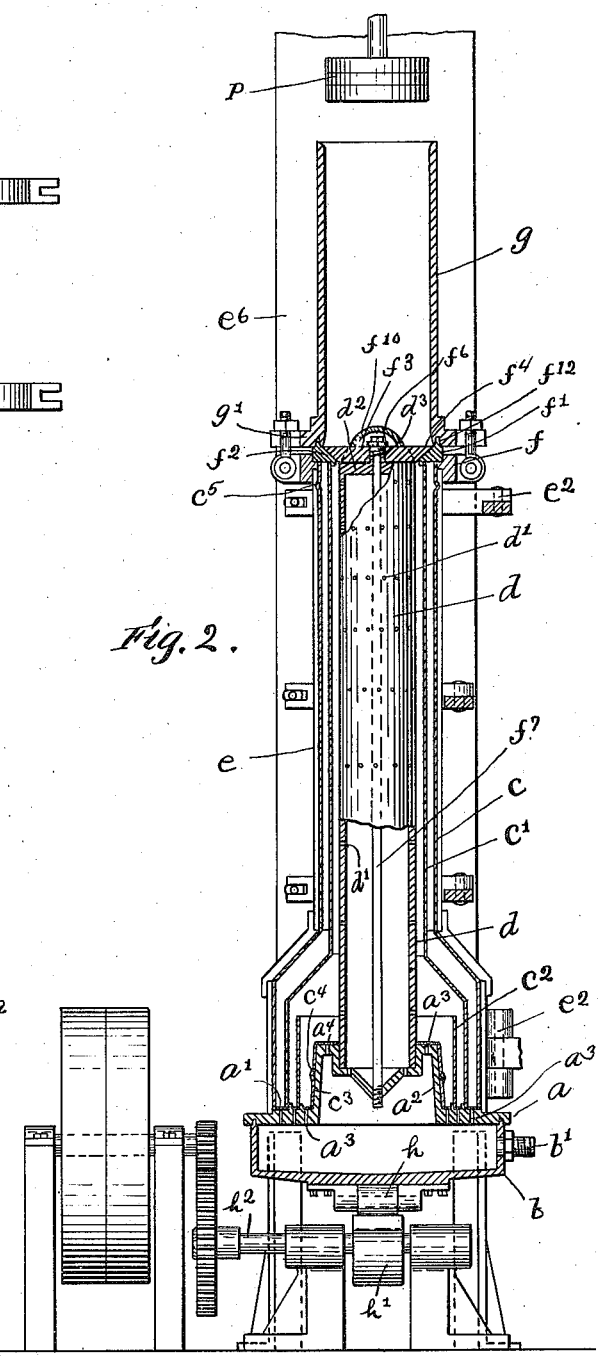

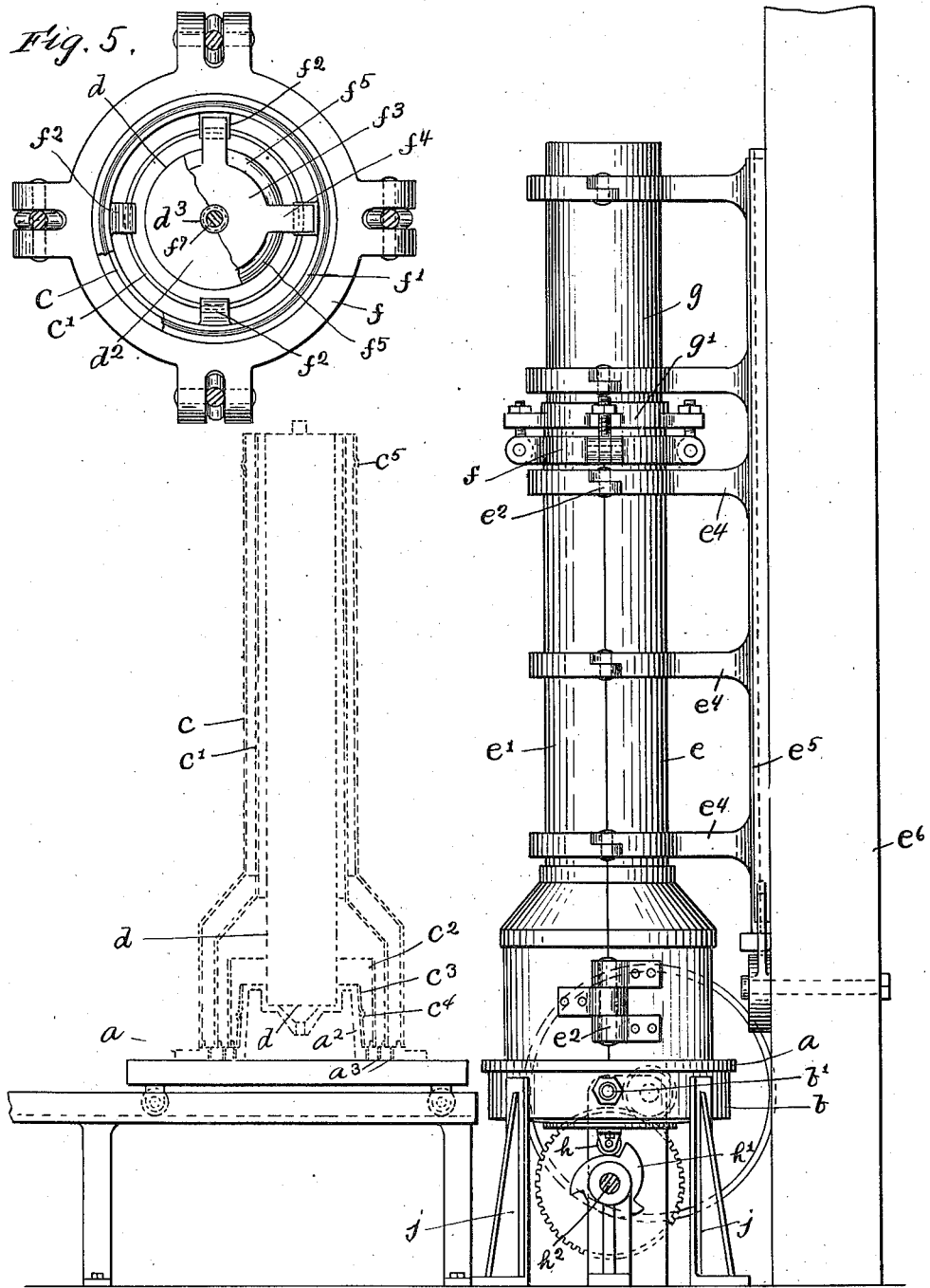

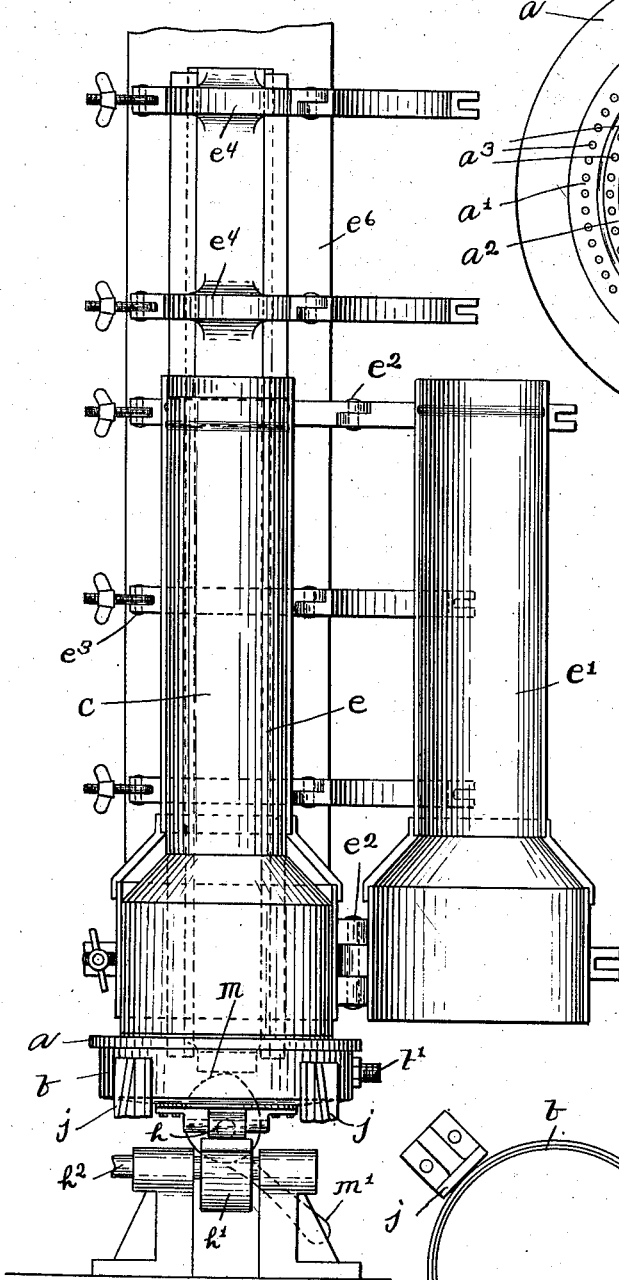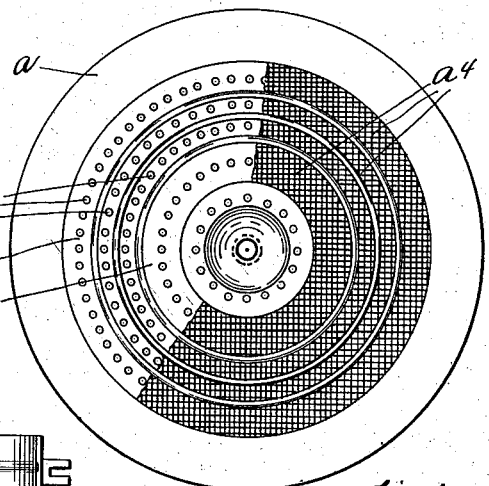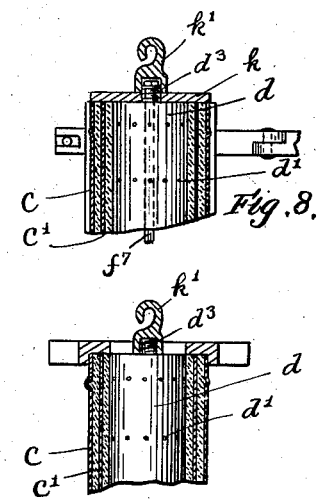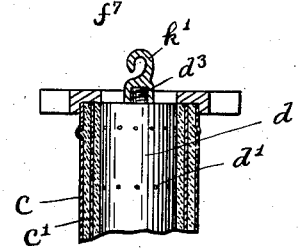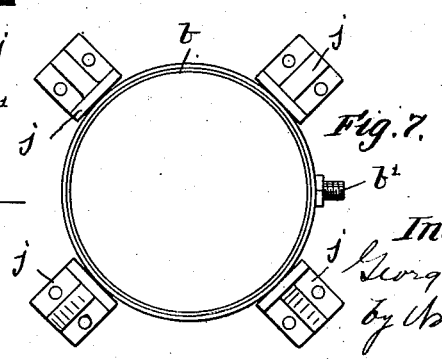

UNITED STATES PATENT OFFICE.

GEORGE W. PRIEST, OF NEWTON, MASSACHUSETTS.

APPARATUS FOR LINING PIPES.

1,072,495.  Specification of Letters Patent.  Patented Sept. 9, 1913.

Application filed February 15, 1909, Serial No. 478,014. Renewed January 24, 1913. Serial No. 744,040.

*To all whom it may concern:*

Be it known that I, GEORGE W. PRIEST, of Newton, county of Middlesex, State of Massachusetts, have invented an Improvement in Apparatus for Lining Pipes, of which the following is a specification.

This invention relates to improvements in apparatus for lining pipes with cement or similar material, such for instance as disclosed in United States Patents #750,660, and #790,372, it being especially adapted for lining pipes of large diameter.

The invention has for its object to provide means for compacting the cement in the space adapted to receive it by jarring it, which consists in jolting, shaking or otherwise vibrating the pipe or some part connected therewith; also to provide means for supporting the pipe to be lined, and a core, and means for repeatedly jolting, shaking or otherwise vibrating the pipe-supporting means and parts connected therewith, to jar the cement and cause it to become firmly compacted in the space between the pipe and core; also to provide a cement-container which is connected with the pipe-supporting means, so that the vibrations may be imparted thereto, whereby the cement is jarred and caused to enter the space adapted to receive it and to become firmly compacted therein; also to provide means for supporting and lining the pipe and means for exhausting the air from the space to be filled with cement, and means for vibrating the pipe to jar the cement and cause it to become compacted in said space; also to provide said vibrating parts with means whereby pressure may be applied to the material which is contained in the space between the pipe and core, such means being arranged to be thrown into operation whenever desired, although ordinarily employed only when the space has been completely filled, yet said pressure applying means may be omitted; also, to provide a hollow-core which is in open communication with a vacuum-box and which is perforated to permit the passage of air through it, but to prevent the passage of cement therethrough; also, to provide a flask for holding the pipe, which is substantially constructed, so that the pipe which is employed may be composed of thin sheet metal.

Figure 1 is a side elevation of an apparatus for lining pipes with cement embodying this invention. Fig. 2 is a vertical section of the same, the metallic pipe-sections being arranged within an inclosing-case preparatory to being lined. Fig. 3 is a front view of the inclosing-case for the pipe, it being shown in closed position. Fig. 4 is a front view of the inclosing-case when opened. Fig. 5 is an enlarged plan view of the inclosing-case and pipe-supporting means, and the core and core-supporting means. Fig. 6 is an enlarged plan view of the top-plate of the vacuum-box, which also serves as the lower end-support for the pipe and core. Fig. 7 is a detail showing the guides for the movable vacuum-box. Figs. 8 and 9 are sectional details showing the parts provided with means for withdrawing the core.

$a$ represents a supporting-plate for the pipe, which is arranged to support a core which is contained within the pipe and also a flask, providing a flask is employed, which in many instances is not necessary. Said plate is adapted to be arranged on top of a vacuum-box $b$, of any suitable shape, size and construction, which is connected by a pipe $b'$, with any suitable means for exhausting the air therefrom. In this instance, as the machine is particularly desired for lining or making composite pipe of large diameter, said supporting-plate $a$ will be made of large diameter and consequently is quite heavy. It is removably placed on top of the vacuum-box, and by reason of its weight and of the weight of the parts placed upon it, it need not necessarily be connected to said box.

The pipe shown in Fig. 2 is one of the many forms the present machine is adapted to line with cement, and comprises a plurality of tubular metal sections of any usual or suitable construction concentrically arranged one within another, with spaces between them, and cement contained in the spaces between the sections and also arranged on the interior of the inner pipe-section. The two tubular metal sections $c$, $c'$ are here shown extended the full length of the pipe to be made, and in the socketed portion thereof short tubular metal sections $c^2$ and $c^3$ are concentrically arranged, yet any other number of sections may be employed, and in lieu of making a socket-pipe, as here shown, a plain cylindrical pipe may be made.

The machine herein to be described is also well adapted for lining heavy pipe of small diameter wherein a single pipe-section only is employed. The supporting-plate $a$ has a seat, formed as a shoulder $a'$, for each pipe-section which is employed in the manufacture of the pipe, and, as here shown, it has three concentrically arranged seats, and the several pipe-sections are arranged in upright position on said supporting-plate with their lower ends in engagement with said seats. As here shown, in Fig. 2 provision is made for a socket-pipe, and the socketed portion of the pipe is arranged at the lower end and the supporting-plate $a$ is made large enough to receive it. The supporting-plate $a$ is also adapted to support a core which is contained in the pipe and which is subsequently withdrawn after the pipe has been lined and the lining has become set. To thus adapt the supporting-plate to receive the core it is herein formed with a central raised portion $a^2$, having a recess in its upper side of suitable size and shape to receive the lower end of the core $d$. The core herein shown is made hollow, because the pipe which is being lined is of large diameter, and it is provided with perforations along its upright walls as shown at $d'$. Said perforations are herein shown as arranged in groups located at short distances apart but they may be otherwise arranged. They are made very small to permit the air and water to be drawn through them into the core, and yet prevent the cement from passing through them into the core. The several groups are arranged throughout the length of the core, preferably at distances apart toward the upper end thereof. The supporting-plate $a$ is provided with numerous perforations $a^3$ which connect the spaces between the several pipe-sections and between the inner pipe-section and core and also the interior of the core, with the interior of the vacuum-box $b$. All of the perforations are made very small. On top of the supporting-plate, over the perforations, gauze rings $a^4$ or equivalent means are placed to prevent the cement passing through the perforations into the interior of the vacuum-box.

As the particular form of pipe herein shown for the purpose of illustrating this invention comprises several thin tubular metallic sections it is necessary to support them to prevent them from bursting while the cement is being compacted in the spaces between them, and to this end a flask is employed, which, as here shown, is composed of two like halves or portions $e$, $e'$, of the shape and size of the pipe to be manufactured or lined, and one of said parts, as $e'$, is connected to its fellow by suitable hinges $e^2$, so that it may be swung open when desired, as represented in Fig. 4. The hinges $e^2$ are formed as clamps comprising two semicircular portions connected together and each embraces a part of the flask so that when the two parts of the flask are closed together the two semicircular portions of the clamps may be connected to securely hold the parts of the flask in closed position. The supporting-plate $a$ is also adapted to receive upon it said flask $e$, $e'$.

In addition to the aforesaid clamp, other clamps are provided for securely holding the parts of said flask in closed position, as many being employed as necessary. All of the clamps are connected by brackets $e^4$ to an upright bar $e^5$ which is arranged in a vertical guideway formed in an upright pillar $e^6$. Said guideway provides for vertical movement of said bar and of the flask connected therewith, and is employed for the purpose of enabling the pipe-supporting means to be jolted or shaken for the purpose of causing the cement or other filling or lining material to enter the space or spaces between the pipe-sections and between the inner pipe-section and core, and to become firmly compacted therein, as will be described.

As a support for the upper end of the flask and pipe-sections and hollow core, a ring $f$ is mounted on the upper end of the flask, having an inwardly extended flange which extends over the upper end of said flask, and the inner diameter of said flange is the same as the external diameter of the outer pipe-section, so as to engage the side of said outer pipe-section and support it against lateral movement. Said ring is rabbeted at its upper side to receive and support a ring $f'$ which extends over the upper end of the outer pipe-section, and said ring $f'$ has several inwardly extended fingers $f^2$, which extend over the upper end of the inner pipe-section. Said fingers are shouldered at their under sides to provide seats against which the upper end of said inner pipe-section bears. Said fingers are made narrow so that the space between the outer and inner pipe-sections is open for the most part to permit passage of the cement or other filling material. Said fingers are also beveled on their upper sides. The upper end of the hollow core $d$ is closed, as at $d^2$, and said closed end has an upwardly extended boss $d^3$ which is externally screw-threaded. A plate $f^3$ rests on top of the core having radially extended fingers $f^4$, which are designed to extend over the fingers $f^2$, and it also has a beveled edge $f^5$ terminating substantially flush with the side of the core. By the engagement of the fingers $f^4$ with the fingers $f^2$ said core is supported centrally in the inner pipe-section. Said fingers $f^4$ are also made quite narrow so that the space between the core and the inner pipe-section is open for the most part. A nut $f^6$ is turned on the screw-threaded boss on the core to hold the plate $f^3$ in fixed position thereon. A tie-rod $f^7$ extends down through the boss and core, the lower end of which engages the supporting-plate $a$, at the lower end of the core, as shown in Fig. 2. A cap $f^{10}$ is placed on the plate $f^3$ which incloses the nut on the upper end of the tie-rod.

$g$ represents the cement-container, which consists essentially of a cylinder, open at the top and bottom, and having at its lower end an outwardly extended flange $g'$, and the lower end of the cylinder is formed with an annular groove which is adapted to receive a rib $f^{12}$ formed on the upper side of the ring $f'$. The cylinder is adapted to be detachably connected with the ring $f$ by suitable clamps, and when thus secured in position the cement contained therein is free to enter the space between the outer and inner pipe-sections and also the space between the inner pipe-section and the core.

For the purpose of causing the cement or other filling material to not only enter the aforesaid spaces but also to become firmly compacted therein, it is herein designed to violently jolt or shake the pipe-supporting means and incidentally the parts connected therewith, and for the purpose of illustrating this feature of my invention the vacuum-box has arranged on its under side a roll $h$, or it may be a boss, which is engaged by a cam $h'$ secured to a rotatable shaft $h^2$ adapted to be driven by power, and said cam is so shaped as to raise the vacuum-box and pipe-supporting means and parts connected therewith and then to permit said parts to fall suddenly, by gravity, and as a result a severe jolt is given to the aforesaid parts which results in the cement being firmly compacted in the spaces provided for it.

Upright guides $j$ are provided for the vacuum-box which permit of its free up and down movement and hold it against lateral movement.

The means thus described permits a jolting or shaking movement of the pipe-supporting means and parts connected therewith in an upward and downward direction, but my invention in this particular is not limited to jolting or shaking the pipe-supporting means and parts connected therewith in any particular direction; or to imparting vibrations to said means by a jolting or shaking operation, or to jolting, shaking or otherwise vibrating all the parts, as the result which it is desired to accomplish is merely to impart to the pipe a vibrating movement so as to jar the cement and cause it to become firmly compacted in the space adapted to receive it, hence my invention comprehends any means which may be employed for imparting vibrations to the pipe whereby this result may be accomplished.

At any stage of the operation pressure may be applied to the cement contained in the cement-container, by means of a piston $p$ which is arranged above the cement-container and is adapted to be moved down into said container whenever desired. The employment of the piston or any other means for applying pressure to the cement contained in the cement-container is optional, although if employed it will be most effective after this cement has been jolted down into the spaces adapted to receive it.

After the pipe has been formed or lined the flask and pipe-supporting means connected therewith are bodily lifted a short distance to disengage the vacuum-box, and they are then free to be moved along onto a truck, and by said truck to be conveyed to a suitable appliance by which the core may be withdrawn. For the purpose of thus lifting the flask and parts connected therewith and also contained therein a cam $m$ is arranged beneath the upright bar $e^5$, which is adapted to be operated by a suitable hand-piece $m'$ or otherwise to lift said bar.

Referring to Figs. 8 and 9, withdrawing means for the core are shown, and in said figures a top-plate $k$ is screwed onto the boss on top of the core having a hook $k'$ which is adapted to be engaged by a suitable tackle for the purpose of lifting the core, and said plate is made of a diameter corresponding to the outside diameter of the pipe so as to extend over the same and its linings.

The composite pipe is herein shown as having a lining of cement arranged in the inside of the inner pipe-section, but in case of a pipe composed of a plurality of pipe-sections the cement contained in each space serves as a lining for the section outside of it.

Having thus described my invention, what I claim as new and desire to secure by Letters Patent is:—

1. In a machine for lining pipe, the combination of means for supporting a plurality of concentrically arranged pipe-sections, a hollow core adapted to be contained in the inner pipe-section, means for supporting said core, means for filling the spaces between said pipe-sections and between the inner pipe-section and the core, and a vacuum-box in open communication with all of said spaces, substantially as described.

2. In a machine for lining pipe, the combination of means for supporting a plurality of concentrically arranged pipe-sections, a hollow perforated core adapted to be contained in the inner pipe-section, means for supporting said core, means for filling the spaces between the pipe-sections and between the inner pipe-section and the core, and a vacuum-box in open communication with all of said spaces and also with the interior of the hollow core, substantially as described.

3. In a machine for lining pipe, the combination of a horizontal supporting-plate having a central recess to receive the lower end of a core and a seat concentric to said recess to receive the lower end of an upright pipe, means engaging the upper ends of the core and pipe, means extending through the core connecting said engaging means with the horizontal supporting-plate, guiding-means for the pipe, means for filling the space between the core and pipe, and means to vibrate said supporting-plate and parts supported by it to cause the filling to become firmly compacted in said space, substantially as described.

4. In a machine for lining pipe, the combination of a horizontal supporting-plate having a central recess to receive the lower end of a core and a seat concentric to said recess to receive the lower end of an upright pipe and having perforations opposite the space between said core and pipe, means engaging the upper ends of the core and pipe, means extending through the core connecting said engaging means with the horizontal supporting-plate, guiding-means for the pipe, means for filling the space between the core and pipe, and means to vibrate said supporting-plate and parts supported by it to cause the filling to become firmly compacted in said space, substantially as described.

5. In a machine for lining pipe, the combination of a horizontal supporting-plate having a central recess to receive the lower end of a core and having a plurality of concentrically arranged seats to receive the lower ends of a corresponding number of pipe sections, means to engage the upper ends of the core and pipe sections, guiding-means for the pipe sections, means for filling the spaces between the core and inner pipe section and also between the pipe sections, and means to vibrate said supporting-plate and parts supported by it to cause the filling to become firmly compacted in said spaces, substantially as described.

6. In a machine for lining pipe, the combination of a horizontal supporting-plate having a central recess to receive the lower end of a core and having a plurality of concentrically arranged seats to receive the lower ends of a corresponding number of pipe sections and having perforations opposite the spaces between the core and inner pipe section and between the pipe sections, means to engage the upper ends of the core and pipe sections, guiding-means for the pipe sections, means for filling the spaces between the core and inner pipe section and also between the pipe sections, and means to vibrate said supporting-plate and parts supported by it to cause the filling to become firmly compacted in said spaces, substantially as described.

7. In a machine for lining pipe, the combination of a horizontal supporting-plate having a central recess to receive the lower end of a core and a seat concentric to said recess to receive the lower end of an upright pipe within which the core is contained, a ring engaging the upper end of the pipe and a top plate engaging the upper end of the core which is held centrally disposed by means connected with the ring, means connecting said top plate with the supporting-plate, and a cement-container arranged above the pipe in open communication with the space between the pipe and core, substantially as described.

8. In a machine for lining pipe, the combination with means for supporting a pipe, a core, means for supporting said core, means for filling the space between the pipe and core, and a vacuum-box in open communication with said space, of means for vibrating the pipe to jar the cement and cause it to become compacted in said space, substantially as described.

9. In a machine for lining pipe, the combination with means for supporting a plurality of concentrically arranged pipe-sections, a core, means for supporting said core, means for filling the spaces between said pipe-sections and between the inner pipe-section and the core, and a vacuum-box in open communication with said spaces, of means for vibrating the pipe, whereby the cement is jarred and caused to become compacted in the spaces adapted to receive it, substantially as described.

10. In a machine for lining pipe, the combination of a horizontal supporting-plate having seats adapted to receive the lower end of an upright pipe and the lower end of a core contained in said pipe and having perforations opposite the space between the pipe and core, a ring engaging the upper end of the pipe and a plate engaging the upper end of the core which is held centrally disposed by means connected with the ring, supporting-means engaging the pipe, a cement-container arranged above the pipe in open communication with the space between the pipe and core, and a pressure-applying device for the cement contained in said container, substantially as described.

11. In a machine for lining pipe, the combination of a horizontal supporting-plate having seats adapted to receive the lower end of an upright pipe and the lower end of a core contained in said pipe and having perforations opposite the space between the pipe and core, a ring engaging the upper end of the pipe and a plate engaging the upper end of the core which is held centrally disposed by means connected with the ring, supporting-means engaging the pipe, a cement-container arranged above the pipe in open communication with the space between the pipe and core, a pressure-applying device for the cement contained in said container, and a vacuum-box on which said horizontal supporting-plate rests, substantially as described.

12. In a machine for lining pipe, the combination of a supporting-plate having a central recess to receive the lower end of a core and a seat concentric thereto to receive the lower end of a bottomless flask, a bottomless flask arranged on said seat, means to engage the upper end of the core and flask, and connecting means between said engaging means and the supporting-plate, and a cement-container arranged above the pipe in open communication with the space between the core and flask, substantially as described.

13. In a machine for lining pipe, the combination of a supporting-plate having a central recess to receive the lower end of a core, and a seat concentric thereto to receive the lower end of an upright pipe, and another seat concentric to the aforesaid seat to receive the lower end of a bottomless flask, a bottomless flask arranged on said seat, means to engage the upper end of the core and pipe and bottomless flask, and connecting means between said engaging-means and the supporting-plate, extended through the core, and a cement-container arranged above the pipe to open communication with the spaces between the core and pipe and the pipe and flask, substantially as described.

14. In a machine for lining pipe, the combination of a supporting-plate having a central recess to receive the lower end of a core and a seat concentric thereto to receive the lower end of a bottomless flask, a bottomless flask arranged on said seat, means to engage the upper end of the core and flask, and connecting means between said engaging-means and the supporting-plate extended through the core, and a cement-container arranged above the pipe in open communication with the space between the core and flask, and means to vibrate said supporting-plate and parts supported by it, substantially as described.

In testimony whereof, I have signed my name to this specification, in the presence of two subscribing witnesses.

GEORGE W. PRIEST.

Witnesses:
  B. J. NOYES,
  H. B. DAVIS.